United States Patent

[11] 3,617,528

[72] Inventor Lee Hilfman
    Prospect Heights, Ill.
[21] Appl. No. 867,085
[22] Filed Oct. 16, 1969
[45] Patented Nov. 2, 1971
[73] Assignee Universal Oil Products Company
    Des Palines, Ill.

[54] HYDROTREATING PROCESS AND CATALYST
    7 Claims, No Drawings
[52] U.S. Cl..................................................... 208/216,
    252/435, 252/437, 252/455, 252/465
[51] Int. Cl...................................................... C10g 23/02
[50] Field of Search........................................... 252/455 R,
    459, 437, 435; 208/217, 216, 465

[56] References Cited
    UNITED STATES PATENTS

| | | | |
|---|---|---|---|
| 3,211,801 | 10/1965 | Holm et al. ................... | 252/437 |
| 3,232,887 | 2/1966 | Pessimisis..................... | 252/437 |
| 3,262,874 | 7/1966 | Gatsis........................... | 252/437 |
| 3,287,280 | 11/1966 | Colgan et al.................. | 252/437 |
| 3,294,659 | 12/1966 | O'Hara......................... | 252/437 |
| 3,453,219 | 7/1969 | O'Hara......................... | 252/437 |
| 3,493,517 | 2/1970 | Jaffe............................. | 252/459 |

*Primary Examiner*—Delbert E. Gantz
*Assistant Examiner*—G. J. Crasanakis
*Attorneys*—James R. Hoatson, Jr. and Robert W. Erickson ABSTRACT: A hydrotreating (or hydrorefining) catalyst of an alumina-containing porous carrier material, a nickel component and a phosphorous component. The catalyst contains from about 1.0 to about 10.0 percent by weight of a nickel component and from about 5.0 to about 40.0 percent by weight of a phosphorous component; preferred catalysts also contain from 4.0 to about 30.0 percent by weight of a Group VI-B metal component. The catalyst is prepared in a manner which inhibits the formation of nickel aluminate to the extent that not more than 0.1 percent by weight thereof is present in the final catalytic composite.

HYDROTREATING PROCESS AND CATALYST

APPLICABILITY OF INVENTION

Hydrotreating, or hydrorefining, is a process well-known and thoroughly described in the literature relating to petroleum refining technology. Applicable published literature abounds with references relative to suitable hydrotreating catalysts, various methods of catalyst manufacture and the process techniques employed in the utilization thereof. Hydrorefining processes are effected at operating conditions which promote a multiplicity of reactions including denitrification and desulfurization primarily, and asphaltene conversion, nondistillable hydrocarbon conversion, hydrogenation and hydrocracking to a somewhat lesser extent. The terms "hydrorefining" and "hydrotreating" are generally employed synonymously to allude to a process wherein a hydrocarbonaceous feedstock is "cleaned up" in order to prepare a charge stock suitable for utilization in a subsequent hydrocarbon conversion process, and in which some conversion to lower-boiling products is effected. In many instances, the hydrorefining process is effected to desulfurize a sulfurous black oil to produce a lower-boiling fuel oil which meets local specifications with respect to sulfur content.

Well-known is the fact that it is especially advantageous to catalytically reform various straight-run gasolines, natural gasolines, catalytically cracked naphtha fractions and/or thermally cracked hydrocarbon distillates for the primary purpose of improving the motor fuel and antiknock characteristics thereof. Hydrorefining processes are utilized, therefore, to produce a substantially saturated charge stock, for use in the catalytic reforming process, which charge stock is substantially free from sulfurous and nitrogenous compounds. Hydrotreating processes are not, however, limited to an improvement in the physical and chemical characteristics of a naphtha boiling range charge stock. The literature is replete with a multitude of processes and catalysts to be employed in the hydrorefining of heavier charge stocks including kerosene fractions for use as jet fuels, light gas oils, full-boiling range gas oils, heavy gas oils and even "black oils". In petroleum refining technology, a black oil is considered to be one containing excessive quantities of sulfurous and nitrogenous compounds, high molecular weight organometallic complexes principally comprising nickel and vanadium, and asphaltic material. Black oils are often characterized as those hydrocarbonaceous mixtures containing nondistillable material having a boiling point above a temperature of about 1,050° F. With respect to such hydrocarbonaceous material, an abundant supply of which exists, it is not only necessary to effect the substantial desulfurization and denitrification thereof, but further to convert nondistillables into distillable hydrocarbons, as well as convert a significant quantity of the heptane-insoluble asphaltic material.

The process of the present invention is directed toward the use of a novel catalytic composite for hydrotreating hydrocarbonaceous material, and particularly for effecting desulfurization of the heavier charge stocks known as black oils. An illustrative example of a black oil, to which the present scheme is applicable, is a vacuum tower bottoms product having a gravity of about 7.1° API, and containing 4.05 percent by weight of sulfur and about 23.7 percent by weight of heptane-insoluble asphaltenes. Another example of a black oil is a vacuum residuum having a gravity of about 8.8° API, and containing about 3.0 percent by weight of sulfur and about 4,300 p.p.m. by weight of nitrogen, and having a 20.0 percent volumetric distillation temperature of 1,055° F.

OBJECTS AND EMBODIMENTS

A principal object of my invention is to provide a novel catalytic composite for use in hydrotreating hydrocarbonaceous material. A corollary objective is directed toward a catalytic composite which promotes desulfurization, denitrification, hydrogenation, hydrocracking, etc.

Another object is to provide an improved process for hydrotreating a sulfurous hydrocarbon charge stock, which process is effected utilizing a coextruded catalytic composite of an alumina-containing porous carrier material, a nickel component and a phosphorous component.

Therefore, in one embodiment, the present invention relates to a hydrotreating catalyst comprising coextruded particles of an alumina-containing porous carrier material, a nickel component and a phosphorous component. A more limited embodiment involves a coextruded catalytic composite comprising an alumina-containing porous carrier material, from about 4.0 percent to about 30.0 percent by weight of a Group VI-B metal component, from about 1.0 percent to about 10.0 percent by weight of a nickel component and from about 5.0 percent to about 40.0 percent by weight of a phosphorous component.

In another embodiment, the hydrotreating conditions include a maximum catalyst bed temperature of about 200° F. to about 900° F., a pressure of about 400 to about 5,000 p.s.i.g., an LHSV of about 0.1 to about 10.0 and a hydrogen concentration of about 1,000 to about 50,000 s.c.f./bbl.

Other objects and embodiments of my invention relate to additional details regarding the preferred catalytic ingredients, the concentration of components within the catalytic composite, the method of catalyst preparation, preferred processing techniques and similar particulars which are hereinafter presented in the following more detailed summary of my invention.

SUMMARY OF INVENTION

Catalytic composites which are tailored for use in a process for hydrotreating hydrocarbonaceous material, and particularly residual stocks or black oils, have traditionally consisted of an element chosen from the Iron-group metals, particularly nickel or cobalt, combined with a metal component from the metals of Group VI-B, particularly molybdenum or tungsten. In general, preferred metal components have been shown to be nickel and molybdenum in combination, or nickel and tungsten, and these components are generally combined with a porous carrier material comprising alumina and silica, and one which is either amorphous, or zeolitic in nature. Ample evidence is found in the literature to indicate that the nickel component, while present in a significantly lower concentration than either molybdenum or tungsten, materially contributes to the desired activity of the catalyst. A perusal of the published literature relative to this phase of catalysis confirms the effect of nickel on catalytic activity. Furthermore, the prior art indicates a preference for two particular methods of catalyst preparation. One method, predominantly preferred, involves impregnating a previously calcined carrier material, generally in the form of spheres or pills, with suitable soluble compounds of the nickel and molybdenum. The impregnating technique is generally followed by drying at a temperature of about 300° F. and calcination at a temperature of about 1,100° F. The second preparation scheme involves coprecipitating all the components, including those of the carrier material. For example, an aqueous solution of aluminum chloride, sodium silicate, nickel chloride and molybdenum oxide is formed and coprecipitated by the addition of ammonium hydroxide. The art, while speculatively teaching that the final catalytic composite may take the form of extrudates, quite clearly indicates an overwhelming preference for spheres and/or pills which are impregnated with the metal components, or coprecipitated therewith. My investigations into the field of hydrorefining catalyst containing, for example, nickel and molybdenum, have indicated that an acceptable coextruded catalyst is not readily prepared. The poor results obtained with such catalysts appear to be inherent in the catalyst manufacturing method. Extrudates are generally prepared by a scheme which involves coprecipitating the carrier material and the nickel and molybdenum components. The precipitate is filtered and dried, and then rehydrated to a consistency which is suitable for extrusion purposes. The extrudates are then subjected to drying and high temperature calcination. During this calcination step, the nickel component reacts with the alumina to form a nickel aluminate which in effect destroys the desired activity of the nickel component for hydrorefining.

My investigations have indicated further that an active hydrotreating catalyst can be prepared in the form of extrudates by a method which involves coextruding the nickel component and the preformed carrier material in the presence of phosphoric acid. It is now possible, therefore, to produce a coextruded hydrotreating catalyst containing the desired nickel and molybdenum components, or nickel and tungsten components, and one which contains less than about 0.1 percent by weight of nickel aluminate. Other advantages include the attractive economics involved in a more simple and faster catalyst preparation technique. It will be immediately recognized by those possessing expertise in the art of catalyst manufacturing schemes, that the use of coextrusion eliminates several tedious steps involved, for example, in an impregnation technique. Further, the use of larger capacity equipment is possible, leading to greater catalyst production in a shorter period of time. One principal advantage resides in the production of catalyst particles, coextrudates, having pore diameters in the highly desired range of about 100 to about 300 Angstroms. Control of the pore diameter is readily regulated by the pressure imposed in forming the extrudates. With respect to spheres and/or pills, control of pore diameter is available only through the tedious regulation of the apparent bulk density.

Considering first the porous carrier material, it is preferred that it be an adsorptive, high-surface area support. Suitable carrier materials are selected from the group of amorphous refractory inorganic oxides including alumina, titania, zirconia, chromia, magnesia, boria and mixtures of two or more such as alumina-silica, alumina-zirconia, alumina-silica-boron phosphate, etc. When of the amorphous refractory inorganic oxide type, a preferred carrier material constitutes a composite of alumina and silica, with silica being present in an amount of about 10.0 percent to about 90.0 percent by weight. In many applications of the present invention, the carrier material will consist, at least in part, of a crystalline aluminosilicate. This may be naturally occurring, or synthetically prepared, and includes mordenite, faujasite, Type A or Type U molecular sieves, etc. When a crystalline aluminosilicate, or zeolitic material, is intended for use as the carrier material, it may be prepared in a number of ways known in the art. One common method constitutes mixing solutions of sodium silicate, or colloidal silica, and sodium aluminate, and permit the solutions to react to form a solid crystalline aluminosilicate. Another acceptable method is to contact a solid inorganic oxide from the group of silica, alumina and mixtures thereof with an aqueous treating solution containing alkali metal cations (preferably sodium) and anions selected from the group of hydroxyl, silicate and aluminate, and permit the solid-liquid mixture to react until the desired crystalline alumino-silicate has been formed. The carrier material may comprise a combination in which the zeolitic material is dispersed within an amorphous matrix, the latter being alumina, silica or silica-alumina. It is understood that the coextrusion scheme employed for preparing the catalyst of the present invention does not involve coprecipitation of the active metal components with the carrier material. The latter is preformed prior to any contact with the nickel and molybdenum, or tungsten.

Following the formation of the coextruded particles, the final composite will generally be dried at a temperature in the range of about 200° F. to about 600° F. for a period of from 2 to about 24 hours or more, and finally calcined at a temperature of about 700° F. to about 1,200° F. in an atmosphere of air, for a period of about 0.5 to about 10 hours. When the carrier material comprises a crystalline aluminosilicate, it is preferred that the calcination temperature not exceed about 1,000° F.

METHOD OF CATALYST PREPARATION

The initial step of the catalyst preparation technique involves commingling the preformed carrier material, for example, a composite of 63.0 percent by weight of alumina and 37.0 percent by weight of silica with a phosphoric acid solution of a suitable salt of nickel. Such salts include nickel nitrate hexahydrate, nickel chloride, nickel bromide, etc. Proportions are used which result in a final catalytic composite comprising from 1.0 percent to about 10.0 percent by weight of nickel, calculated as the element, and 5.0 percent to about 40.0 percent by weight of a phosphorous component, calculated as $PO_4$. The acidic mixture is mulled, and subsequently aged for a short period of about 15 minutes to about 2 hours. The Group VI-B metal component, where desired, in a concentration of 4.0 percent to about 30.0 percent by weight, calculated as the element, is added at this stage of the preparation technique through the use of a suitable compound such as ammonium molybdate, tungstic acid, molybdic acid, ammonium tungstate, etc. The mixture is again subjected to mulling and a quiescent age for an additional period of about 15 minutes to about 2 hours. The resulting plastic-type mass is extruded under a suitable pressure in the range of about 1,000 to about 10,000 p.s.i.g., to form extrudates of the desired size— e.g., one-sixteenth inch by one-sixteenth inch. After drying and calcining in the manner hereinbefore set forth, the extrudates are found to contain less than 0.1 percent by weight of nickel aluminate.

Although not essential to successful desulfurization, it is often preferred to incorporate a halogen component into the catalytic composite. Although the precise form of the chemistry of association of the halogen component with the carrier material and metallic components is not accurately known, it is customary in the art to refer to the halogen component as being combined with the carrier material, or with the other ingredients of the catalyst. The halogen may be either fluroine, chlorine, iodine, bromine, or mixtures thereof, with fluorine and chlorine being particularly preferred. The quantity of halogen is such that the final catalytic composite contains about 0.1 percent to about 3.5 percent by weight, and preferably from about 0.5 percent to about 1.5 percent by weight, calculated on the basis of the elemental halogen.

Prior to its use in the conversion of hydrocarbons, the resultant catalytic composite may be subjected to a substantially water-free reduction technique. Substantially pure and dry hydrogen (less than about 30.0 vol. p.p.m. of water) is employed as the reducing agent. The calcined composite is contacted at a temperature of about 800° F. to about 1,200° F. for a period of about 0.5 to about 10 hours, and effective to substantially reduce the metallic components.

Additional improvements are generally obtained when the reduced composite is subjected to a presulfiding operation for the purpose of incorporating therewith from about 0.05 percent to about 0.50 percent by weight of sulfur, on an elemental basis. The presulfiding treatment is effected in the presence of hydrogen and a suitable sulfur-containing compound such as hydrogen sulfide, low molecular weight mercaptans, various organic sulfides, carbon disulfide, etc. A preferred technique involves treating the reduced catalyst with a sulfiding gas, such as a mixture of hydrogen and hydrogen sulfide having about 10 mols of hydrogen per mol of hydrogen sulfide, at conditions selected to effect the desired incorporation of sulfur. It is generally considered a good practice to perform the presulfiding technique under substantially water-free conditions.

The hydrocarbon charge stock and hydrogen are contacted with a catalyst of the type described above in a hydrocarbon conversion zone. The contacting may be accomplished by using the catalyst in a fixed-bed system, a moving-bed system, a fluidized-bed system, or in a batch-type operation. In view of the risk of attrition loss of the catalyst, it is preferred to use a fixed-bed system. In this type of system, a hydrogen-rich vaporous phase and the charge stock are preheated by any suitable heating means to the desired initial reaction temperature, the mixture being passed into the conversion zone containing the fixed-bed of the catalytic composite. It is understood, of course, that the hydrocarbon conversion zone may consist of one or more separate reactors having suitable means therebetween to insure that the desired conversion temperature is maintained at the entrance to one or more catalyst beds. The reactants may be contacted with the catalyst in either upward, downward or radial flow fashion, with a downward/radial flow being preferred.

The operating conditions imposed upon the reaction zone, or zones, are primarily dependent upon the charge and the desired end result. However, these conditions will generally include a maximum catalyst bed temperature of about 200° F. to about 900° F., a pressure of about 400 to about 5,000 p.s.i.g., an LHSV of about 0.1 to about 10.0 and a hydrogen concentration of about 1,000 to about 50,000 s.c.f./bbl. Hydrotreating processes are generally exothermic in nature, and an increasing temperature gradient will be experienced as the hydrogen and charge stock traverse the catalyst bed. It is desirable to maintain the maximum catalyst bed temperature below about 900° F., which temperature is virtually identical to that which may be conveniently measured at the outlet of the reaction zone. In order to insure that the catalyst bed temperature does not exceed the maximum allowed, conventional quench streams, either normally liquid or normally gaseous, may be introduced at one or more intermediate loci of the catalyst bed. In some situations, a heavy hydrocarbonaceous material is intended for hydrorefining, accompanied by some conversion into lower-boiling hydrocarbon products. A portion of the normally liquid product effluent, boiling above the end boiling point of the desired product, will be recycled to combine with the fresh feed charge stock. In this type of process, the combined liquid feed ratio (defined as volumes of total liquid charge to the reaction zone per volume of fresh liquid feed to the reaction zone) will be within the range of about 1.1 to about 6.0.

ILLUSTRATIVE EXAMPLE

Specific operating conditions, processing techniques, a particular catalytic composite and other individual process details will be given in the following description of a process to which my invention is applicable. In presenting this illustration, it is not intended that the present invention be limited to the specifics, nor is it intended that a given process be limited to the particular operating conditions, catalytic composite, processing techniques, charge stock, etc. Therefore, it is understood that the present invention is merely illustrated by the specifics hereinafter set forth.

A coextruded nickel-molybdenum desulfurization catalyst was prepared by commingling 200 grams of calcined alumina (about 30 to 40 mesh), 32.5 grams of nickel nitrate hexahydrate and 24.94 grams of 85.0 percent phosphoric acid. The mixture was mulled and subsequently aged for a period of about one-half hour. Ammonium molybdate, in an amount of 24.24 grams, and starch, in an amount of two grams, were added, and the mass was mulled and aged quiescently for a period of one-half hour. The mixture was extruded, at about 6,500 p.s.i.g., into one-sixteenth inch extrudates which were subsequently dried for 2 hours at 225° F. and calcined for 1 hour at 1,100° F. The apparent bulk density of the finished catalyst was 0.739 gm./cc., and analysis indicated a composition of 3.4 percent by weight of nickel, 7.6 percent by weight of molybdenum and 13.0 percent by weight of $PO_4$.

This catalytic composite was tested by processing a vacuum gas oil having a gravity of 22.2 °API, a boiling range of 490° F. to 944° F., and containing 1.85 percent by weight of sulfur. The operating conditions included a pressure of 1,100 p.s.i.g., a catalyst bed inlet temperature of 700° F., an LHSV of 3.0 and a hydrogen concentration of 3,000 s.c.f./bbl. Following a 14 hour line out period, two individual 2 hour test periods were conducted. During the first 3 hours of the line out period, the catalyst bed inlet temperature was increased from 500° F. to 700° F. The residual sulfur content of the product from each of the 2 hour test periods was 0.73 percent by weight.

A second catalyst was prepared by commingling 200 grams of the alumina, 20.0 grams of molybdic oxide, 2.0 grams of starch and 21.6 grams of nickel nitrate hexahydrate dissolved in 120 cc. of water. The mixture was mulled into an extrudable paste and extruded, at a pressure of about 6,500 p.s.i.g., into one-sixteenth-inch extrudates. These were dried for 2 hours at 225° F. and calcined for 1 hour at 1,100° F. When this catalytic composite was tested with the vacuum gas oil as hereinbefore described, the residual sulfur numbers on the product were 1.35 percent and 1.34 percent by weight.

The foregoing specification and example indicates the method of effecting the present invention and the benefits to be afforded through the utilization thereof.

I claim as my invention:

1. A hydrotreating catalyst comprising coextruded particles of a carrier material selected from the group consisting of alumina and alumina-silica, a nickel component and a phosphorous component, and containing less than 0.1 percent by weight of nickel aluminate, said catalyst having been prepared by mixing a preformed carrier material as specified above with a nickel component and phosphoric acid, extruding the resulting mixture, drying and calcining the resulting extrudate, said phosphoric acid functioning to minimize formation of nickel aluminate during said calcination step.

2. The catalyst of claim 1 further characterized in that a Group VI-B metal component is combined therewith.

3. The catalyst of claim 1 further characterized in that said carrier material is a crystalline aluminosilicate.

4. A hydrotreating catalyst comprising coextruded particles of a carrier material selected from the group consisting of alumina and alumina-silica, from about 4.0 percent to about 30.0 percent by weight of a Group VI-B metal component, from about 1.0 percent to about 10.0 percent by weight of a nickel component and from about 5.0 percent to about 40.0 percent by weight of a phosphorous component, and containing less than 0.1 percent by weight of nickel aluminate, said catalyst having been prepared by mixing a preformed carrier material as specified above with Group VI-B metal and nickel components and phosphoric acid, extruding the resulting mixture, drying and calcining the resulting extrudate, said phosphoric acid functioning to minimize formation of nickel aluminate during said calcination step.

5. The catalyst of claim 4 further characterized in that said Group VI-B metal component is molybdenum, or a compound of molybdenum.

6. The catalyst of claim 4 further characterized in that said Group VI-B metal component is tungsten, or a compound of tungsten.

7. A process for desulfurizing a sulfurous hydrocarbon charge stock which comprises reacting said charge stock and hydrogen, at desulfurization conditions, selected to convert sulfurous compounds into hydrogen sulfide and hydrocarbons, in contact with a coextruded composite of a carrier material selected from the group consisting of alumina and alumina-silica, a nickel component, a Group VI-B metal component and a phosphorous component, and containing less than 0.1 percent by weight of nickel aluminate, said catalyst having been prepared by mixing a preformed carrier material as specified above with Group VI-B metal and nickel components and phosphoric acid, extruding the resulting mixture, drying and calcining the resulting extrudate, said phosphoric acid functioning to minimize formation of nickel aluminate during said calcination step.

* * * * *